United States Patent [19]

Hagen

[11] 4,062,184

[45] Dec. 13, 1977

[54] CRYOGENIC FUEL EVAPORATION IN COMPRESSOR OF GAS TURBINE

[75] Inventor: Hermann Hagen, Dachau, Germany

[73] Assignee: Motoren- und Turbinen-Union Munchen GmbH, Munich, Germany

[21] Appl. No.: 556,502

[22] Filed: Mar. 7, 1975

[30] Foreign Application Priority Data

Mar. 20, 1974 Germany .............................. 2413507

[51] Int. Cl.² .......................... F02G 3/00; F02C 7/16; F02C 3/22

[52] U.S. Cl. .......................... 60/39.28 P; 60/39.46 G; 60/39.67; 60/39.71

[58] Field of Search ............. 60/39.71, 39.46, 39.28 P, 60/39.14, 39.67, 39.74 R, 39.3, 39.05, 39.06

[56] References Cited

U.S. PATENT DOCUMENTS

| | | | |
|---|---|---|---|
| 2,602,289 | 7/1952 | Anxionnaz et al. | 60/39.46 X |
| 2,630,678 | 3/1953 | Pratt | 60/39.74 R |
| 2,689,452 | 9/1954 | Jordan | 60/39.74 R |
| 2,718,753 | 9/1955 | Bridgeman | 60/39.02 |
| 2,907,527 | 10/1959 | Cummings | 60/39.66 |
| 2,952,974 | 9/1960 | Wright | 60/39.3 |
| 2,977,756 | 4/1961 | Stone | 60/39.28 P |
| 3,263,421 | 8/1966 | Londal | 60/39.14 |
| 3,313,103 | 4/1967 | Johnson | 60/39.46 X |

Primary Examiner—William L. Freeh
Assistant Examiner—Thomas I. Ross
Attorney, Agent, or Firm—Alan H. Levine

[57] ABSTRACT

A gas turbine engine having a compressor and a combustion chamber, a supply of liquid hydrogen, and means for injecting the hydrogen in a cryogenic state into the intake of the compressor or into the compressor one or more stages downstream from its intake. Some of the hydrogen may also be injected into the combustion chamber. The hydrogen directed to the combustion chamber may be heated by heat from the engine lubricating oil or hot engine components. Hydrogen may be injected into the compressor only at speeds above idle speed. Hydrogen flow to the compressor may remain substantially constant, but hydrogen flow to the combustion chamber may vary over a wide range.

5 Claims, 1 Drawing Figure

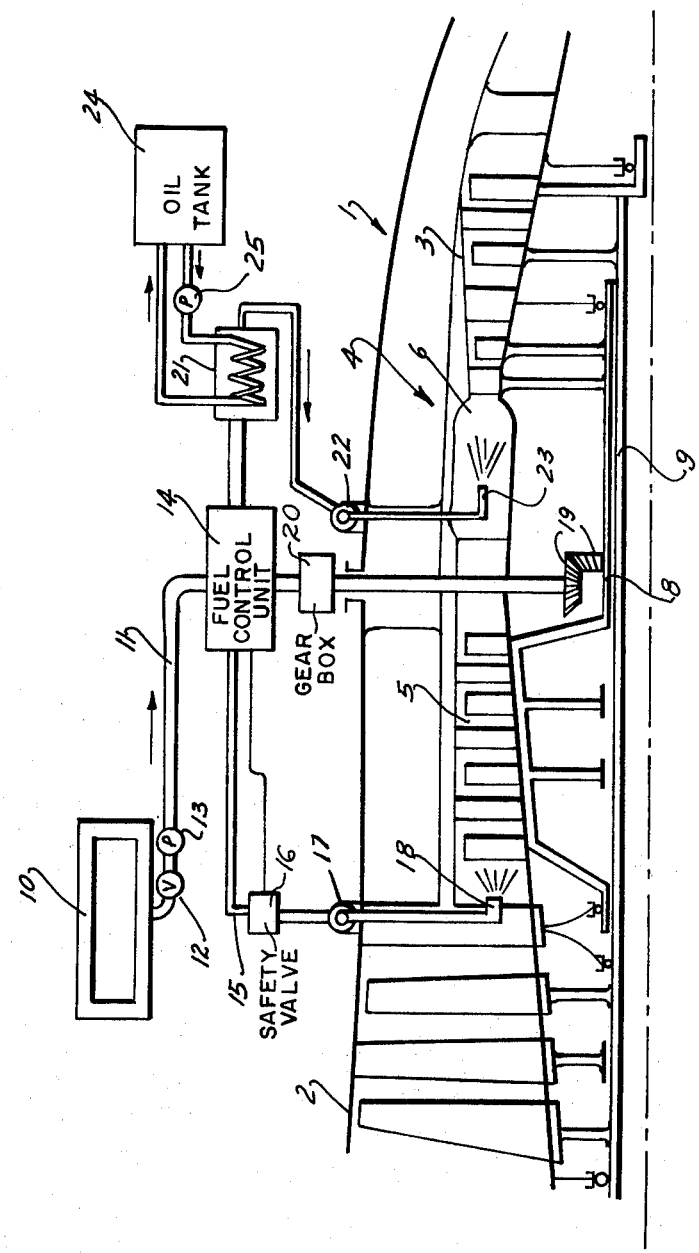

CRYOGENIC FUEL EVAPORATION IN COMPRESSOR OF GAS TURBINE

This invention relates to a gas turbine operating on hydrogen.

Hydrogen is a known fuel for gas turbines. In use, especially in aircraft gas turbines, it is necessary to introduce the hydrogen into the fuel tank in its liquid state and at a very low temperature (−252° C), and to use very effective thermal insulation to keep it at this low temperature so that the tank volume at normal pressure may be small and its weight low.

Before hydrogen is fed to the combustion chamber of an engine it must be evaporated and, for best results, heated to a temperature above ambient. For this purpose, it has been suggested that the liquid hydrogen be used to cool the engine lubricant and/or hot components. The volume of heat needed for evaporation and heating is many times that needed for cooling the oil. On the other hand, cooling components with hydrogen poses difficult design problems. Evaporation using hot gases in heat exchangers would be possible but uneconomical and dangerous.

It is a broad object of the present invention to provide a gas turbine wherein the hydrogen needed in the combustion chamber is evaporated in a simple manner and where the working cycle of the gas turbine is improved while its operational reliability is promoted, or at least not impaired.

It is a particular object of the present invention to provide a gas turbine wherein the hydrogen fed to the combustion chamber is admitted in the cryogenic state entirely or partially in the region of the compressor intake, or a few axial-flow compressor stages downstream from the intake. This rapidly cools the compressor air, reduces the specific compression required, and also reduces the compressor exit temperature. At a constant turbine inlet temperature, this provides a greater difference between the compressor exit temperature and the turbine inlet temperature or, at the same amount of heating, a lower turbine inlet temperature, which improves thermal efficiency and specific performance. Swirling in the compressor provides improved conditioning of the mixture even before it reaches the combustion chamber, thereby preventing blowback of the flame into the mixing zone, and thus impaired reliability, due to the very high air velocity when compared to the velocity of flame propagation.

When the cryogenic hydrogen is fed to the upstream end of the compressor, improvement to the gas turbine cycle will be a maximum. Yet, where engines are susceptible to compressor intake icing, the point of injection should best be farther downstream to prevent compressor wall and blade icing in the first few stages.

Although the cooling effect is greatest when the hydrogen is fed to the compressor area in its entirety, it is recommended that at full load only a portion of the hydrogen be fed to the compressor and the remainder to the combustion chamber, so that the ignition point of the hydrogen-air mixture is not reached even at extreme conditions (for hydrogen about 4.1% by volume). To this leaner mixture the remaining hydrogen, evaporated as it is as a result of heat of the oil and of cooling the components, is added in the combustion chamber, after the air has been compressed. In the case of bypass engines where cold air is diverted from the compressor, the liquid hydrogen is injected at a point downstream from the cold air tap. Otherwise, portions of the hydrogen will not reach the combustion chamber and will be wasted.

A further improvement is afforded by the complete evaporation and heating of the hydrogen to be routed to the combustion chamber. This will, first, precipitate combustion and allow use of a short combustion chamber and, second, prevent overheating of oil or other components with the aid of a small and simple heat exchanger. The supply of hydrogen is controlled by a speed-sensitive valve preventing supply in the idle speed range. This prevents spontaneous combustion of the mixture in the low idle range where the low velocity of flow and the low throughput result in a mixture and promote spontaneous combustion.

With hydrogen being supplied to both the compressor and the combustion chamber, the amount of hydrogen fed to the combustion chamber is variable within a wide range of mixing ratios while the amount going into the compressor is a basic quantity depending on the air flow. This gives an approximately constant cooling of the compressor air and an optimum cooling arrangement, with consideration to the risk of icing, the risk of explosion, and improvement of thermal efficiency.

The drawing is a schematic illustration of a gas turbine according to this invention.

The embodiment illustrated on the accompanying drawing is a bypass engine 1 comprising a low-pressure compressor 2, a low-pressure turbine 3, a gas generator 4, a high-pressure compressor 5, a combustion chamber 6, a high-pressure turbine 7, a thermally insulated reservoir 10 for cryogenic hydrogen, a pump 13, a shut-off valve 12, a supply line 11, and a fuel control unit 14. The high and low-pressure rotary members are arranged on separate shafts 8 and 9, respectively. An engine oil tank 24 supplies hot oil through a pump 25, to a heat exchanger 21 in which part of the hydrogen is evaporated. Power to drive the fuel control unit 14 and the pump is taken from one of the rotating engine shafts by means of gears 19 and a gearbox 20. Liquid hydrogen to the compressor is supplied through the fuel control unit 14, a first line 15, a safety valve 16 to interrupt the supply of hydrogen at a speed in the idle range, and a first manifold 17 to spread the hydrogen over several circumferentially spaced injection nozzles 18 at a point of injection upstream of high-pressure compressor 5. By means of a fuel control unit 14 the amount of flow of hydrogen to the compressor may be varied with variations in speed of the compressor. If this location is susceptible to icing, the point of injection can be one or more compressor stages farther downstream. The supply of the remaining hydrogen is from the fuel control unit 14 and through the oil cooler/heat exchanger 21 where the still liquid hydrogen is evaporated. It could still be used for cooling other hot components. The hydrogen, now evaporated and heated, is then directed through a second manifold 22 to the combustion chamber nozzles 23.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A gas turbine engine comprising:

a. a compressor, a combustion engine downstream from the compressor, and a turbine downstream from the combustion chamber,
b. a supply of liquid hydrogen,
c. means for injecting hydrogen from the supply into the combustion chamber,
d. means for injecting the hydrogen in a liquid state into the compressor at a point at least one stage downstream from the compressor intake, said stage being far enough from the compressor outlet so that the hydrogen evaporates before reaching the combustion chamber but the air temperature at said stage being high enough so as to prevent icing of the compressor intake or of the parts of the compressor first stage, and
e. means for controlling flow of hydrogen to the compressor so that hydrogen is injected into the compressor only when the engine is running above idle speed.

2. A gas turbine as defined in claim 1 wherein the engine is a multiple flow bypass engine, and said injection means (d) injects the hydrogen into a stage the air flow of which passes fully through the combustion chamber.

3. A gas turbine as defined in claim 1 including means for heating the hydrogen directed to the combustion chamber with heat from at least one of hot engine oil and hot engine components.

4. A gas turbine as defined in claim 1 including means for varying the flow of hydrogen to the compressor with variations in speed of the compressor.

5. A gas turbine as defined in claim 4 including means for adjusting the flow of hydrogen to the combustion chamber.

* * * * *